US009618327B2

(12) United States Patent
Lord et al.

(10) Patent No.: US 9,618,327 B2
(45) Date of Patent: *Apr. 11, 2017

(54) METHODS AND ARRANGEMENTS FOR OBJECT POSE ESTIMATION

(71) Applicant: Digimarc Corporation, Beaverton, OR (US)

(72) Inventors: John D. Lord, West Linn, OR (US); Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/969,422

(22) Filed: Aug. 16, 2013

(65) Prior Publication Data

US 2014/0071268 A1  Mar. 13, 2014

Related U.S. Application Data

(63) Continuation-in-part of application No. 13/863,897, filed on Apr. 16, 2013.

(60) Provisional application No. 61/624,815, filed on Apr. 16, 2012.

(51) Int. Cl.
*G06T 7/00* (2006.01)
*G01B 11/00* (2006.01)
*H04N 5/225* (2006.01)

(52) U.S. Cl.
CPC .......... *G01B 11/002* (2013.01); *G06T 7/0044* (2013.01); *H04N 5/2256* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 2005/0189411 A1* | 9/2005 | Ostrowski et al. | 235/383 |
| 2006/0060652 A1* | 3/2006 | Trifilo | 235/462.01 |
| 2007/0269080 A1* | 11/2007 | Hamanaka | 382/106 |
| 2010/0150434 A1 | 6/2010 | Reed | |
| 2011/0157178 A1* | 6/2011 | Tuzel et al. | 345/426 |
| 2011/0176029 A1 | 7/2011 | Boydston et al. | |
| 2012/0077542 A1* | 3/2012 | Rhoads | 455/556.1 |
| 2012/0218444 A1 | 8/2012 | Stach | |
| 2013/0048722 A1 | 2/2013 | Davis et al. | |
| 2013/0223673 A1 | 8/2013 | Davis et al. | |

FOREIGN PATENT DOCUMENTS

WO   WO2008152922   12/2008

* cited by examiner

*Primary Examiner* — Kevin McInnish
(74) *Attorney, Agent, or Firm* — Digimarc Corporation

(57) ABSTRACT

In an illustrative embodiment, the free space attenuation of illumination with distance, according to a square law relationship, is used to estimate the distance between a light source and two or more different areas on the surface of a product package. By reference to these distance estimates, the angular pose of the product package is determined. Plural frames of imagery, captured both with and without illumination from the light source, can be processed to mitigate the effects of ambient lighting.

24 Claims, 2 Drawing Sheets

METHODS AND ARRANGEMENTS FOR OBJECT POSE ESTIMATION

RELATED APPLICATION DATA

This application is a continuation-in-part of copending application Ser. No. 13/863,897, filed Apr. 16, 2013 (published as 20130314541), which claims priority to provisional application 61/624,815, filed Apr. 16, 2012.

TECHNICAL FIELD

The present technology concerns estimating the pose of an object relative to a camera, such as at a supermarket checkout.

INTRODUCTION AND SUMMARY

Pending patent application Ser. Nos. 13/231,893, filed Sep. 13, 2011 (published as US20130048722), 13/750,752, filed Jan. 25, 2013 (published as US20130223673), and 61/544,996, filed Oct. 7, 2011, detail various improvements to supermarket checkout technology. In some aspects, those arrangements concern using a camera at a checkout station to read steganographically-encoded digital watermark data encoded in artwork on product packaging, and using this information to identify the products.

One issue addressed in these prior patent applications is how to determine the pose of the object relative to the camera. Pose information can be helpful in extending the off-axis reading range of steganographic digital watermark markings. The present technology further addresses this issue.

In accordance with one aspect of the present technology, the free space attenuation of illumination with distance, according to a square law relationship, is used to estimate the distance between a light source and two or more different areas on the surface of a product package. By reference to these distance estimates, the angular pose of the product package is determined. Plural frames of imagery, captured both with and without illumination from the light source, can be processed to mitigate the effects of ambient lighting.

The foregoing and other features and advantages of the present technology will be more readily apparent from the following detailed description, which proceeds with reference to the accompanying drawings.

DETAILED DESCRIPTION

Figure 1:
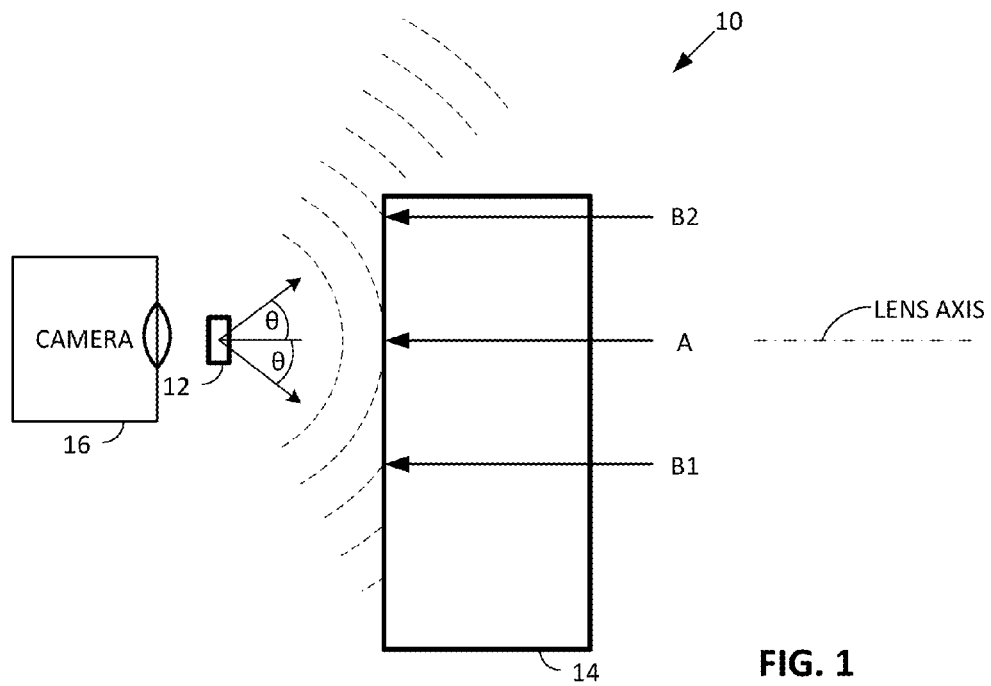
FIG. 1 shows an object being illuminated by a light source and imaged by a camera, where the object surface is perpendicular to the axis of the camera.

FIG. 1 shows an arrangement 10 (e.g., looking from above down from above a supermarket checkout station) in which a light source 12 illuminates an object 14. A camera 16 captures imagery of the illuminated object through a lens. (The light source is positioned as close as practical to the lens axis of the camera, but not so as to obscure the camera's view.)

The light source 12 desirably approximates a point source. A light emitting diode (LED) is suitable. The LED may be unpackaged, and without an integrated lens. Such a light source produces spherical wavefronts having uniform power density at all illuminated angles (i.e., until masking by the light source mounting arrangement blocks the light).

The object 14 may be, e.g., a cereal box.

As shown in FIG. 1, the light power density falling on the object 14 is at a maximum at point A (the point closest to the source 12), with the illumination falling off at other points on the object surface. If the surface normal at point A passes through the light source, as shown, then two points on the object surface that are the same distance from point A (e.g., points B1 and B2) will be equally illuminated. Indeed, all points on the object surface that are equally distant from point A are equally illuminated. Put another way, all points lying on the surface of object 14 that are a given angle $\theta$ off-axis from the light source (and camera lens), are equally illuminated.

The illumination strength at any point is a function of distance from the light source, according to a square law relationship. That is, the power emitted by the light source is distributed over the spherical wavefront. The surface area of this wavefront increases with distance from the source per the formula $4*Pi*d^2$ (where d is distance), causing the power per unit surface area to diminish accordingly.

In the illustrated example, angle $\theta$ is about 38 degrees. The distance between the light source and point B1 is thus about 1.26 times the distance between the light source and point A (i.e., $1/\cos \theta$). Accordingly, the light power density at point B1 (and at point B2) is about 62% of the light power density at point A.

Figure 2:
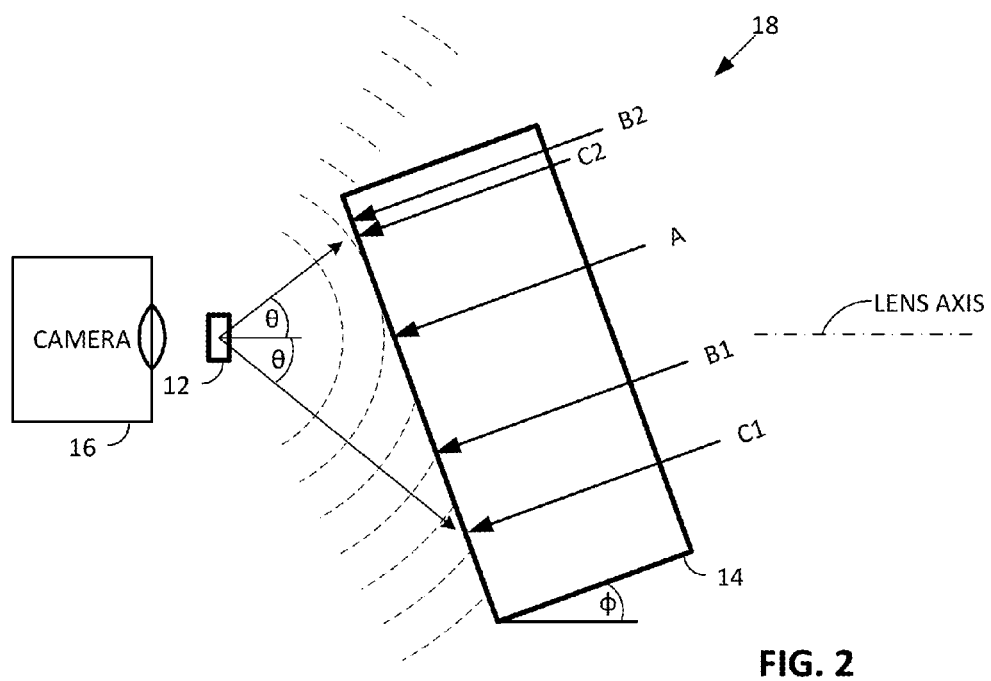
FIG. 2 is similar to FIG. 1, but shows the situation when the object surface is inclined relative to the axis of the camera.

Consider, now, the arrangement 18 shown in FIG. 2. Here, object 14 is inclined by an angle $\phi$ relative to the lens axis of the camera 16.

In this case, points on the surface of object 14 that are uniformly spaced from point A (i.e., points B1 and B2) are not equally illuminated. Similarly, points lying on the surface of object 14 that are a given angle $\theta$ off-axis from the camera lens (i.e., points C1 and C2) are not equally illuminated.

By comparing the light power density at a patch of pixels around point C1, relative to the light power density at a patch of pixels around point A (or point C2), the inclination angle $\phi$ of the object 14 can be determined.

(It will be recognized that there is a fixed mapping between different pixels in the camera's sensor array, and different angles $\theta$.)

As just-indicated, the light power density on the surface is indicated by the pixel values produced by the camera 16. These pixel values will additionally be a function of the printing and artwork on the box. For example, if the box is printed with a dark color of ink, less light will be reflected to the camera, and the pixel values output by the camera will be commensurately reduced.

To reduce the effect of inked object printing on the reflected light sensed by the camera, illumination and sensing at near-infrared is desirably used. Conventional cyan, magenta and yellow printing inks are essentially transparent to near-infrared, so an infrared-sensitive camera 16 sees-through such inks to the base substrate. The base substrate is generally uniform in reflectivity, so the light reflected from the substrate is essentially a function of the distance from the light source 12, alone.

Black ink, however, is not near-infrared transparent. Its treatment is discussed below.

Near infrared is generally considered to be those wavelengths just beyond the range of human perception, e.g., 750 nanometers and above. Far infrared, in contrast, is generally regarded to start at 15 μm. Near infrared LED sources are commonly available (e.g., the Epitex L810-40T52 810 nm LED, and the Radio Shack 940 nm LED), as are infrared-sensitive cameras.

An illustrative method proceeds as follows:

Illuminate the object using near-IR. Illumination closer to the object is preferable than more distant illumination, since the square-law variation across inclined surfaces will then be greater. As noted, near-IR avoids color ink effects, and helps retain a relatively uniform reflectance over an object.

Capture monochrome image data with the camera.

For a point on a normal plane surface, the image brightness drops off with the inverse square of the light-to-object-to-camera distance. So for a surface at an angle to the camera/illumination axis (assuming no specular reflectance), the brightness will vary according to distance. (As discussed above in connection with FIG. 1, this variation will also be observed in the periphery of a flat normal surface.)

The amount of brightness change for a unit change in distance is a function of absolute distance (the inverse square relationship). A gently sloped surface that's close will have a similar intensity gradient as a steeply sloped surface that's farther away.

One method to distinguish these two cases is to pre-calculate this brightness drop-off function, and fit a histogram of the image brightness to it, to estimate the object distance. Then this estimated distance is used as a parameter in the projection estimation.

A next step in this exemplary procedure is to generate a histogram of the image pixel values. Delete from the histogram all completely black pixels (or pixels with illumination below a threshold that corresponds to no object in the field of view). Think of this as camera flash guide numbers, camera ISO, and flash range. We care only about the object that's within useful depth range for our camera system. (Note: a range of exposures with different flash intensities can help in distance estimation too.) Similarly, remove any unusually bright points from the histogram.

Fit the remaining image brightness histogram to the pre-calculated brightness drop-off function, to get an estimate of object distance. We can assume uniform grey or some empirically derived grey level depending on typical object material reflectance for the lighting used and camera ISO.

For patches of image pixels arranged in a grid, estimate the average image brightnesses. Apply an estimated correction to these using the overall image brightness histogram and the above-noted inverse-square function.

Then calculate a projective transform for each region of the image to be examined, possibly combining multiple patches to filter for object reflective variations from printing, etc. The camera and optical system is known (specific focal length, sensor size, etc.) for the calculation.

Once the projective transform for a patch of image pixels has thereby been estimated, geometrically correct the patch of image pixels to virtually re-project onto a plane normal to the camera axis. This corrected patch of image pixels is then passed to the steganographic watermark decoder for decoding.

Figure 3:
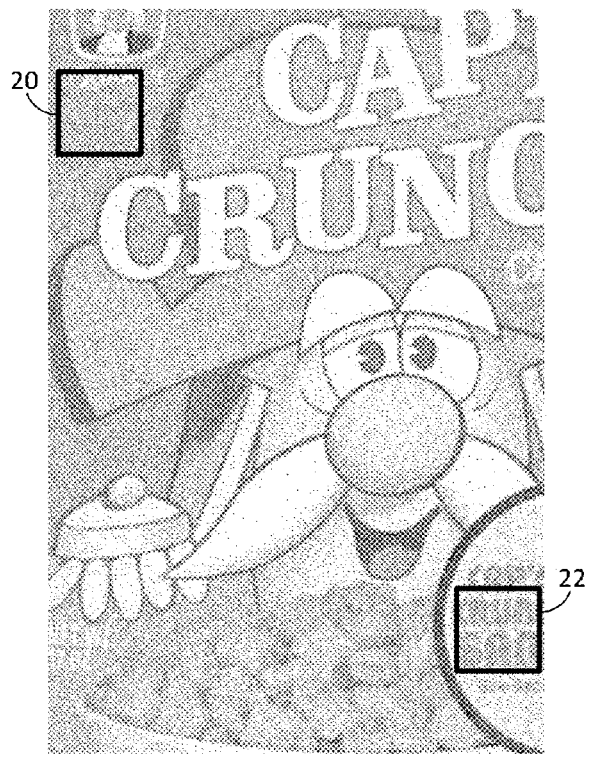
FIG. 3 shows two spaced apart regions on a cereal box that are determined to be free of black ink printing.

As noted, black ink is not transparent to near IR illumination; it absorbs such illumination, resulting in a darkening of the corresponding pixels. To address this problem, the presence of black ink markings can be sensed by local variation in reflectance from the object—which is uncharacteristic of reflectance from the underlying substrate. Various image busyness metrics can be applied for this purpose. One is to measure the standard deviation of the image patch. Alternatively an edge detector, like Canny, can be used. After application of such a black ink-discriminating process, two or more spaced-apart regions on the object can be identified, and corresponding excerpts of the pixel data (e.g., 20 and 22 in FIG. 3) can be used in determining the object pose.

Figure 4:
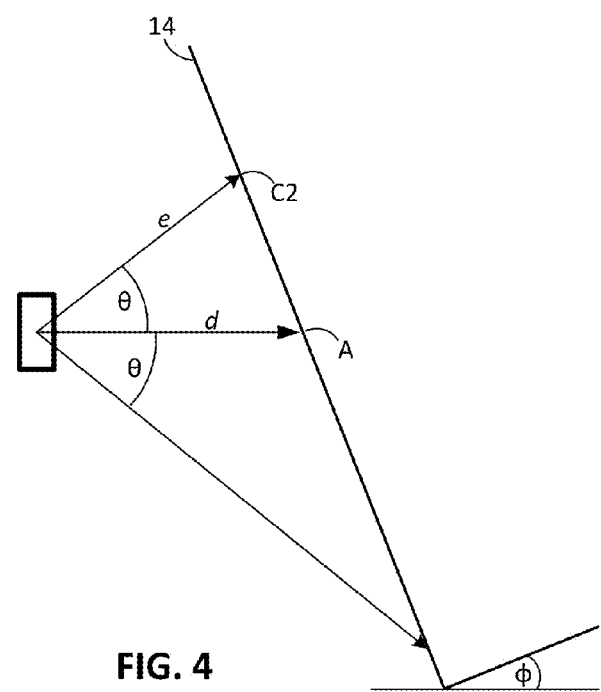
FIG. 4 is an expanded excerpt of FIG. 2.

FIG. 4 is an enlarged excerpt from FIG. 2. The average illumination around point C2 is determined from the captured camera data. Likewise for the average illumination around point A. The distance "d" from the light source to point A on the object is estimated from the brightness of the imagery captured from a region around point A (e.g., per the histogram fitting arrangement described above). The analysis then estimates the distance "e" from the light source to point C2 by reference to the two average illumination values, and by angle θ (38 degrees in this example, which corresponds to pixel offset from the center of the image frame, per a lens function).

In the illustrated example, the average illumination around point C2 is 95% that around point A. This indicates that distance "e" is about 97.5% of distance "d." If distance "d" is brightness-estimated to be 6 inches, then distance "e" is 5.85 inches. In the illustrated case, with an angle θ of 38 degrees between a horizontal base of 6 inches, and a side "e" of 5.85 inches, geometrical analysis indicates angle φ has a value 20 degrees.

Thus, in this case, the imagery captured from the camera is virtually re-projected to remove this 20 degree perspective aspect, to yield a set of processed data link that which would be viewed if the surface of object 14 were perpendicular to the camera. A watermark decoding operation is then applied to the re-projected image data.

Plural-Frame Processing

In some environments, the intensity of ambient light may interfere with the above-detailed measurement arrangements. To make the technology more robust against such interference, a plural-frame measurement can be undertaken, e.g., using a camera's video mode.

During capture of one image frame, the object 14 is illuminated by both the light source 12, and by ambient illumination (which may be, e.g., fluorescent, incandescent, halogen, or natural light, etc.). During capture of another image frame, the object is illuminated only by the ambient illumination. That is, the light source 12 is de-energized, or its illumination is otherwise blocked or diverted from falling on the object. A difference is then computed between the captured image frames, e.g., by subtracting pixel values in the latter image frame from those in the former. The difference will depict the object illuminated only by the light source 12—without any contribution from the ambient lighting.

Concluding Remarks

Having described and illustrated the principles of our technology with reference to an exemplary embodiment, it will be recognized that the technology is not so limited.

For example, while a point source—which generates spherical wavefronts of uniform power density—is illustrated, this is not essential. An alternative is to use a light source that does not have uniform illumination at all angles. The illumination strength as a function of off-axis angle (which may be in two dimensions) can be measured or estimated. The effects of such illumination can then be corrected-for in the analysis of object pose estimation.

Similarly, it is not necessary that the light source be positioned near the axis of the camera. Again, other arrangements can be employed, and the differences in object surface illumination due to such placement can be measured/estimated, and such effects can be corrected-for in the analysis of object pose estimation.

While illustrated in the context of a planar object surface, it will be recognized that the same principles can likewise be applied with curved object surfaces.

Similarly, while described in connection with determining the inclination angle in one dimension (e.g., horizontally), the same principles can likewise be used to find the inclination angles in more than one dimension (e.g., horizontally and vertically).

Reference was made to the light source 12 being as close as practical to the camera lens. Desirably, the distance from the light source to the lens is one-tenth, or less, the distance from the lens to the object. For example, if the distance from the lens to the object is 20 inches, the light source is desirably within two inches of the lens. (Within one inch would be still better.) If this one-tenth ratio is met, the light source is regarded as being "near" the lens. Under these conditions, an approximation that the light source and the lens are at the same location is valid.

If the light source and lens are more distant, the present technology can still be utilized. However, the fall-off of object illumination as sensed by the camera will not directly indicate the pose of the object relative to the camera. As noted, the fall-off of object illumination is a function of the pose of the object relative to the light source. The techniques detailed above can determine this light source-object pose relationship. Then, knowing the geometric relationship between the light source and the camera, the pose of the object relative to the camera can be determined.

Although the illustrated arrangement employs infrared illumination, this is not essential. Areas of artwork with similar color can be assessed from captured imagery, and points in such similarly-colored areas can be used as a basis for pose assessment. For example, the captured imagery can be represented in a YUV or LAB color space, which represents pixels by data that quantify the pixels' chrominance separately from their luminance. (The luminance varies with illumination, while the chrominance does not.) A chrominance histogram can be determined, either across all the pixels of the image, or across a subset (e.g., a swath of pixels that are a given angle θ off-axis from the camera lens, plus and minus a small delta-angle—such as one to three degrees). The pixel color that dominates the histogram is then selected, and serves as a mask by which similarly-colored regions of the image are selected. (Some slight variation on color around this dominant color may be permitted.) The earlier-detailed process is then applied to the luminance data for points within this masked image, and the resulting measurements will be free of differences due to printed elements of the artwork.

While the method was described by reference to the difference in illumination between two surface areas on the package, such example was adopted for expository convenience. Other implementations may consider many more patches on the object surface, and sense the intensity of illumination reflected from each. This measured pattern of reflectivity can be compared against an iteratively adjusted model of reflectivity at such locations, as the modeled surface inclination angle φ changes, until a minimum divergence between actual and modeled response (e.g., using a least squares metric) is achieved.

The above-noted plural-frame measurements are subject to numerous variations. For example, the frames needn't be captured in immediate sequence. And more than two frames can be used. For example, to mitigate the time-varying intensity of some electric lights (due to their alternating current excitation), two or more frames illuminated solely by ambient lighting can be captured, and their average can be subtracted from the average of two or more frames that include both the ambient lighting and lighting from source 12. During different of these frame captures, the illumination from light source 12 may be changed, in intensity, wavelength, polarization, etc. (E.g., during the interval of one frame capture, the light source may illuminate the object with infrared illumination; in another frame interval, the light source may illuminate the object with green illumination; etc.)

To better address rapidly-changing ambient light (e.g., color and intensity varying with alternating current excitation), the plural-frame measurements can be synced to the AC power signal. For example, a zero-crossing detector can monitor the AC power signal, and trigger (or mark) the capture of frames at a consistent AC signal phase. (A fixed delay beyond the zero crossing may be used.) Frames captured at these consistent points in the AC cycle will have more consistent ambient lighting, leading to more consistent ambient light removal.

Some embodiments may employ a camera with a "global" shutter, while others can employ a camera with a "rolling" shutter. Such distinction, and a variety of related illumination and sensing techniques, are detailed in copending application Ser. Nos. 13/964,014, filed Aug. 9, 2013 (published as US20130329006), and 13/888,939, filed May 7, 2013 (published as US20140057676).

While described in the context of reading digital watermark indicia, such pose determination methods are also applicable to object identification by other means, such as by barcode reading, fingerprint-based identification (e.g., SIFT), etc.

Digital watermark technology is detailed, e.g., in U.S. Pat. No. 6,590,996 and in published application 20100150434.

Patent application Ser. No. 13/088,259, filed Apr. 15, 2011 (published as 20120218444), details other pose estimation arrangements useful in watermark-based systems.

In the interest of conciseness, the myriad variations and combinations of the described technology are not cataloged in this document. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The invention claimed is:

1. A method comprising the acts:
   illuminating an object surface with a light source, the object surface including patterned inked markings;
   capturing image data from the illuminated object with a camera;
   determining that first and second spaced-apart regions on the object lack black ink markings, said first and second regions being depicted by first and second excerpts of the captured image data, the first excerpt having a first average brightness value and the second excerpt having a second average brightness value; and
   based on information including said first and second average brightness values, determining pose information for the object.

2. The method of claim 1 in which the illuminating comprises illuminating the object with infrared illumination.

3. The method of claim 1 in which the identifying act comprises applying a busyness metric to identify first and second regions that are free of black ink markings.

4. The method of claim 1 in which the identifying act comprises selecting first and second regions on the object that are symmetrically located across an optical axis of the camera, both at an angle θ away from said axis.

5. The method of claim 1 that includes determining a pose of the object relative to the camera.

6. The method of claim 1 in which the camera has a lens axis, and in which the act of determining pose information comprises determining an angle at which the object surface diverges from an orientation that is normal to the lens axis.

7. The method of claim 1 wherein the first and second average brightness values are functions of distances from the light source to said regions, alone, and are not functions of printing on the object surface.

8. The method of claim 1 wherein at least one of said first or second regions comprises cyan, magenta or yellow ink.

9. The method of claim 8 wherein said at least one of the first or second regions comprises cyan, magenta or yellow ink in a patterned arrangement.

10. The method of claim 1 wherein the first and second regions are marked differently with ink.

11. The method of claim 1 in which the act of determining that said first and second regions lack black ink markings includes applying a busyness metric to determine that said regions lack black ink markings.

12. The method of claim 1 in which the act of determining pose information includes determining which of said first or second regions is closer to the light source.

13. The method of claim 1 in which the act of determining pose information comprises estimating information about distances between said camera and said first and second regions, by reference to said first and second average brightness values.

14. The method of claim 1 that further includes virtually re-projecting the captured image data, using said determined pose information, so that the object surface appears to be perpendicular to a viewing axis of the camera, rather than inclined.

15. The method of claim 14 that further includes decoding payload data from the virtually re-projected image data.

16. The method of claim 1 in which said act of determining that the first and second regions lack black ink markings includes determining standard deviation values for the first and image excerpts.

17. The method of claim 1 in which said act of determining that the first and second regions lack block ink markings includes applying a Canny detector to the captured imagery to identify regions that lack black ink markings.

18. The method of claim 1 in which said act of determining pose information is based on said first and second average brightness values, and also on first and second angles at which said first and second regions are disposed relative to an axis of the camera.

19. The method of claim 1 in which said act of determining pose information is based on information including a ratio between the first and second average brightness values.

20. The method of claim 1 that includes, based on information including said first and second average brightness values, estimating an angle at which the object surface is inclined relative to an axis of the camera.

21. The method of claim 1 performed using a scanner at a supermarket checkout station.

22. A system comprising a camera system including a lens, a light source, a processor, and a memory, wherein the memory contains programming instructions that configure the system to perform acts including:
   capturing plural frames of image data from an object surface, under different lighting conditions that variously include ambient light and light from a light source, and processing said frames to produce processed image data;
   determining that first and second spaced-apart regions on the object lack black ink markings, said first and second regions being depicted by first and second excerpts of the processed image data, the first excerpt having a first average brightness value and the second excerpt having a second average brightness value; and
   based on information including said first and second average brightness values, determining pose information for the object.

23. A non-transitory computer readable medium containing instructions for configuring a camera- and light source-equipped supermarket checkout system to perform acts including:
   capturing image data from an object presented for checkout, while a surface of the object is illuminated by the light source;
   determining that first and second spaced-apart regions on the object lack black ink markings, said first and second regions being depicted by first and second excerpts of the captured image data, the first excerpt having a first average brightness value and the second excerpt having a second average brightness value; and
   by reference to said first and second average brightness values, determining pose information for the object.

24. A supermarket checkout system comprising:
   a camera system, including a lens and a light source adapted to capture image data from an object presented for checkout;
   first means for determining that first and second spaced-apart regions on a surface of the object lack black ink markings, said first and second regions being depicted by first and second excerpts of the captured image data, the first excerpt having a first average brightness value and the second excerpt having a second average brightness value; and
   second means for determining pose information for the object based on information including said first and second average brightness values.

* * * * *